Aug. 7, 1928.

R. H. EAVES

VALVE RESEATING TOOL AND GAUGE

Filed Nov. 8, 1926

1,679,605

Patented Aug. 7, 1928.

1,679,605

UNITED STATES PATENT OFFICE.

RUEL H. EAVES, OF NEEDLES, CALIFORNIA.

VALVE-RESEATING TOOL AND GAUGE.

Application filed November 8, 1926. Serial No. 146,972.

My invention relates to a device for reseating or facing the composition or rubber seat of an emergency valve commonly used in the triple valves of the air brake systems employed in railroad practice; the invention having for its object the provision of means whereby the valve may be provided with a true seating face and whereby a full and proper seating of the valve is permitted in order that an absolute air-tight joint will be provided.

Another object of my invention is to provide means for gauging the valve; that is to say, the invention also contemplates means for determining whether the valve-stem is true and in proper alignment with the axis of the face in order that a proper and complete seating of the valve may be obtained.

The objects and advantages of my invention will be more readily comprehended from the detailed description of the accompanying drawings, wherein—

My invention is more especially intended for facing the composition of rubber seats of emergency valves commonly used in the triple valves of the air brake systems of railroad cars and also involves means for gauging or determining the alignment of the valve-stem with the axis of the valve face. Emergency valves commonly used in triple valves usually consist of the annular head 10, one face whereof is provided with an annular and somewhat undercut groove 11 provided with a rubber seat indicated at 12 in Figure 2; the valve being provided with the valve-stems 13 and 14 concentric with the axis of the valve-head 10; these stems acting as guides for holding the emergency valve in proper alignment when in place in the triple valve.

In practice, the composition or rubber seat 12 of the emergency valve often becomes coated with a fine rust and pipe scale on the bearing or seating face; and this foreign matter, due to the air pressure which forces the valve against its metallic seat, becomes embedded in the surface of the rubber or composition seat 12, thereby preventing an absolute air-tight joint or seating of the valve.

In order to obtain a proper seating of the emergency valve, it has heretofore been the practice to renew the rubber seat 12 at times when the triple valves of the air brake system are being cleaned or repaired, thus entailing considerable expense and loss in valve-seats capable of being reclaimed or refaced for further use.

With my improved tool, this defective surface of the rubber seat may be refaced and all embedded foreign matter removed, thereby restoring the valve-seat to its original, true condition without the necessity of removing the rubber-seat from the emergency valve.

Figure 1:
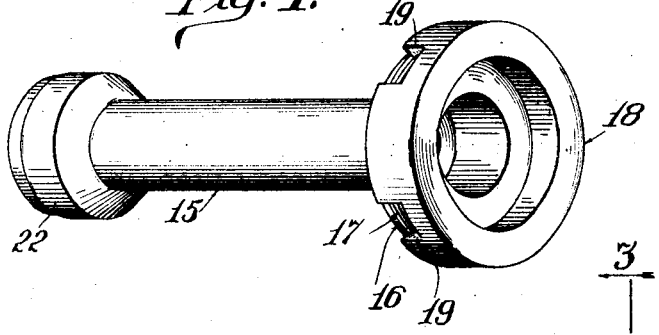
Figure 1 is a perspective view of my improved tool and gauge.
Figure 2:
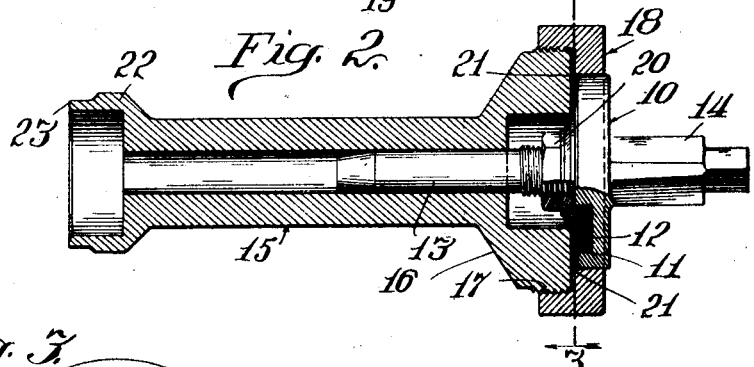
Figure 2 is a longitudinal sectional view of the same with a valve inserted into the reseating tool end thereof.
Figure 3:
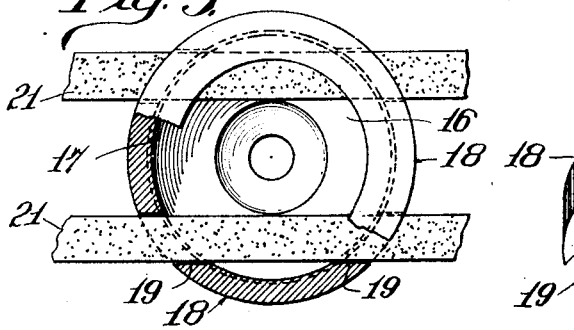
Figure 3 is a cross sectional view taken on the line 3—3 of Figure 2 looking in the direction of the arrows.
Figure 4:
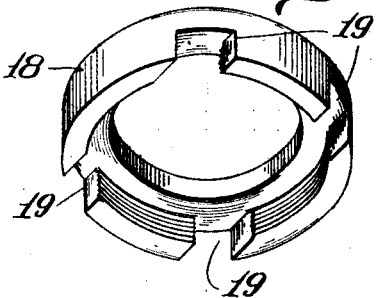
Figure 4 is a detail perspective view of the cap or holding element at the right hand end of the tool as illustrated in Figures 1 and 2.

My improved tool as disclosed in the particular exemplification shown in the drawing comprises the main body or barrel 15, of suitable configuration and size, preferably cylinder as shown, and cored to receive the valve-stem 13 of the emergency valve 10, as shown in Figure 2. The barrel at one end, namely the right hand end as disclosed in Figures 1 and 2, is provided with an enlarged portion or head 16 which, in the particular exemplification illustrated, is externally threaded at 17 in order to receive the internally threaded flange or rim of a cap member 18, the latter being shown in detail in Figure 4. The cap 18 is provided with transversely disposed slots 19, 19, arranged in the flange or rim of the cap and at points adapted to be coincident or register with the rubber or composition seat 12 of the emergency valve 10 when the latter has been properly positioned and applied to the end of the tool. The rubber seat 12 is shown secured in place in the groove 11 by means of the nut 20 which screws on the threaded inner or attached end of the valve-stem 13. The slots 19, 19 are therefore so formed in the rim or flange of the cap member 18, that they will register with the exposed surface of the rubber-seat 12 of the valve, see Figure 2.

That is to say, the slots 19, 19 will register with the rubber-seat 12 at diametrically opposite points and the remainder of the rubber-seat 12 may successively be brought into register with these slots 19, 19 upon proper rotation of the barrel 15 or of the valve, which may readily be accomplished by means of the exposed angularly faced or wrench-receiving valve-stem 14, see Figure 2.

The slots 19, 19 are intended to receive the strips of abrasive cloth 21, 21; these strips with a suitable abrasive coating being inserted in the slots 19, 19 of the cap member 18 before the latter has been tightly screwed into place on the enlarged head or end 16 of the cored body or barrel 15. It is apparent that when it is desired to renew the cutting surface of the strips of abrasive cloth 21, 21, this may be readily accomplished by slightly unscrewing the cap member 18, thus allowing an unused or non-worn portion of the strips to be drawn into register with the valve-seat 12; the strips 21, 21 being firmly clamped between the cap 18 and the enlarged head 16 of the body or barrel 15, as can be seen in Figure 2.

After the strips of abrasive material 21, 21 have been firmly clamped in place, the emergency valve is then inserted in place with the cylindrical stem 13 within the barrel 15, thus bringing the valve-seat 12 into contact with the abrasive surface of the strips 21, 21; valve 10 being free to rotate in the opening in the cap 18, while the other guide-stem 14 of the emergency valve is exposed.

It is apparent that upon rotation of the valve, either by hand or suitable power, while the barrel 15 is held stationary—or vice versa—a cutting action of the strips 21, 21 on the surface of the rubber-seat 12 of the valve will be obtained and as a result all foreign matter embedded in or coating formed on the surface of the valve-seat will be removed and at the same time any irregularities in the surface of the rubber valve-seat will be removed, with the result that the emergency valve will be provided with a true seat, thus restoring the rubber valve-seat 12 to its original condition without the necessity of removing the rubber-seat. With my improved device it will be seen that emergency valves, which require frequent attention, may be kept in proper operating condition without the undue loss of time and expense heretofore encountered in removing and replacing the rubber-seats.

Figure 5:
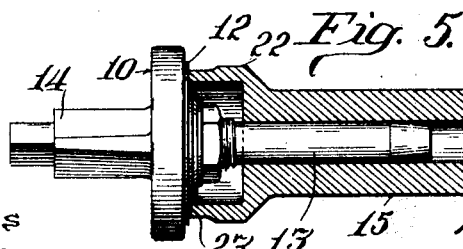
Figure 5 is a longitudinal sectional view of the left hand end of the tool as disclosed in Figures 1 and 2, namely of the gauge end of the tool, with a valve shown inserted in place.

My improved device also involves means for determining the proper alignment of the guide-valve stem 13 with the axis of the valve-seat; and for that reason the main body or barrel 15 at the left hand end as viewed in Figure 2 and as disclosed in Figure 5, is provided with an enlargement 22 which is shown beveled or tapered at the perimeter to provide an annular contacting face or valve-seat engaging surface 23 identical in contour and size with that of the metallic seat with which the emergency valve seat 12 engages when the emergency valve 10 is in place in the triple valve with which it is employed. When employing the gauge end of the device, the guide stem 13 of the emergency valve 10 is inserted in the barrel 15 as shown in Figure 5, so that the rubber-seat 12 of the valve contacts with the true surface 23 of the gauge portion; the core or bore in the body portion or barrel 15 being such that a close fit with the stem 13 of the emergency valve 10 is had if the valve-stem is in proper alignment. It is obvious, that if the valve-stem 13 is slightly bent or out of alignment with the axis of the valve-seat, it will not enter the barrel 15 and permit the valve seat 12 to completely contact with the gauge-seat 23. Upon pressing the emergency valve 10 firmly against the gauge-seat 23 and revolving the valve—or gauge as the case may be—the gauge-seat 23 will define an outline on the rubber-seat 12, and thus indicate whether a perfect seating of the emergency valve can be obtained, thus enabling the operator to determine the reason for and location of any inaccuracies.

I have shown what I believe to be a simple embodiment of my invention applicable for use in connection with any valves of the same general nature as the emergency valves employed with triple valves of railroad airbrake systems and have described the same in terms employed merely as terms of description and not as terms of limitation, as modifications are possible and may be made without, however, departing from the spirit of my invention.

What I claim is:

1. A tool of the character described comprising a body portion provided with an elongated valve-stem receiving passage and terminating in an enlarged externally threaded end provided with a flat annular valve seating face, and a flanged cap provided with a valve-receiving opening, to hold the valve concentrically in place, the flange of said cap being internally threaded to screw onto said enlarged end of the body portion and having slots arranged parallel with said valve seating face adapted to come substantially flush with said face, said slots being adapted to receive strips of abrasive material immovably held in place when said cap is screwed into place.

2. A tool of the character described comprising a cored elongated body portion adapted to receive and to guide the stem of the valve operated on, the body portion terminating in an enlarged end having a flat valve seating face, a valve-receiving member adapted to be removably secured to said enlarged end of the body portion, said member having transversely disposed passages at points coincident with the seating face of the enlarged end of the body portion, and strips of abrasive material insertible through said passages and clamped onto the enlarged end of the body portion by said valve receiving member whereby the seating face of the valve is provided with a smooth surface when a moving frictional relation between said strips and the valve face is provided.

RUEL H. EAVES.